United States Patent [19]

Dahlgren, deceased et al.

[11] Patent Number: 4,628,577
[45] Date of Patent: Dec. 16, 1986

[54] ASSEMBLY FIXTURE FOR STAIR STRINGER WELDMENTS AND THE LIKE

[76] Inventors: Stan Dahlgren, deceased, late of Atlantic Highlands; by Paul Dahlgren, executor, 98 Ocean Blvd., Atlantic Highlands, both of N.J. 07716

[21] Appl. No.: 805,576

[22] Filed: Dec. 5, 1985

Related U.S. Application Data

[63] Continuation of Ser. No. 671,003, Nov. 13, 1984, abandoned.

[51] Int. Cl.⁴ .............................................. B23K 37/04
[52] U.S. Cl. .................. 29/281.1; 228/49.1; 269/40; 269/41
[58] Field of Search ...................... 29/281.1; 228/49.1, 228/44.3, 47; 269/40–41, 43, 904; 249/14; 52/749

[56] References Cited

U.S. PATENT DOCUMENTS 3,062,529 11/1962 Hiller ................................ 269/40 X
3,823,910 7/1974 Crozier ................................. 249/14
3,902,948 9/1975 Morros ........................... 269/904 X

FOREIGN PATENT DOCUMENTS 1954594 2/1980 Fed. Rep. of Germany ........ 249/14

Primary Examiner—Frederick R. Schmidt
Assistant Examiner—Steven P. Schad
Attorney, Agent, or Firm—Mandeville & Schweitzer

[57] ABSTRACT

An adjustable, low cost fixture for the production of stair stringer weldments of the type including a channel beam or the like and a plurality of carrier angle elements welded thereto for the support and positioning of tread and riser elements in the completed stair. The fixture includes an elongated reference beam, and means to clamp the reference beam to a flange of the channel member at an adjustable level from the edge of the channel. A plurality of carrier angle nesting blocks are individually clamped to the reference beam at spaced points along its length and in a predetermined angular orientation relative thereto. The nesting blocks are provided with notched out portions for receiving and positioning the carrier angle elements during welding thereof to the channel beam. Removable spacing and angle gages enable a series of nesting blocks to be clamped to the reference beam with a highly uniform spacing and angular orientation, significantly improving product quality and enabling great savings to be realized in production economies.

5 Claims, 6 Drawing Figures

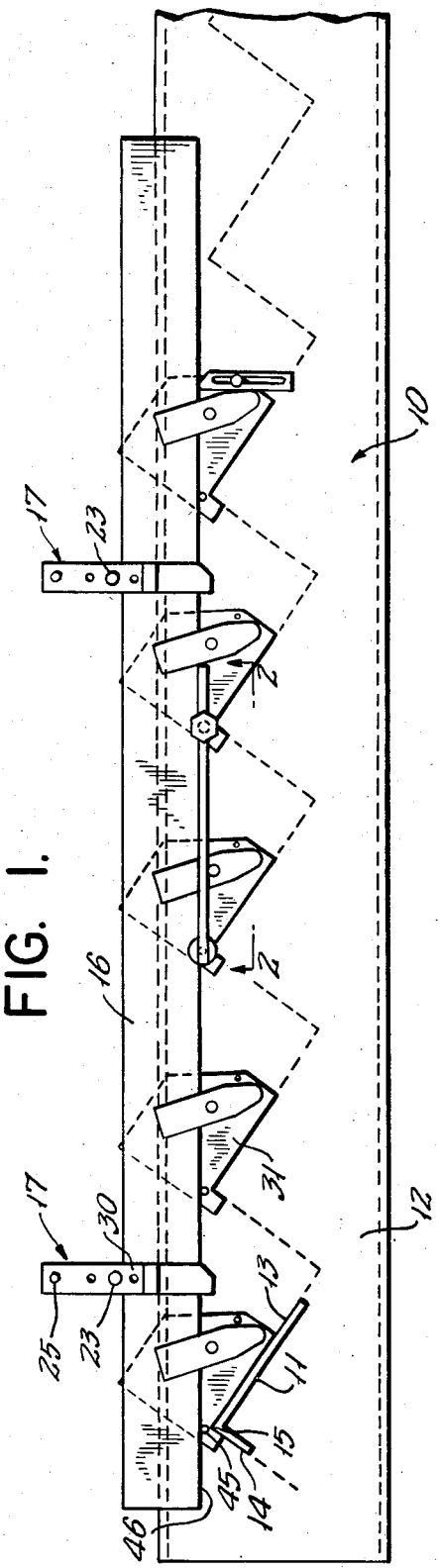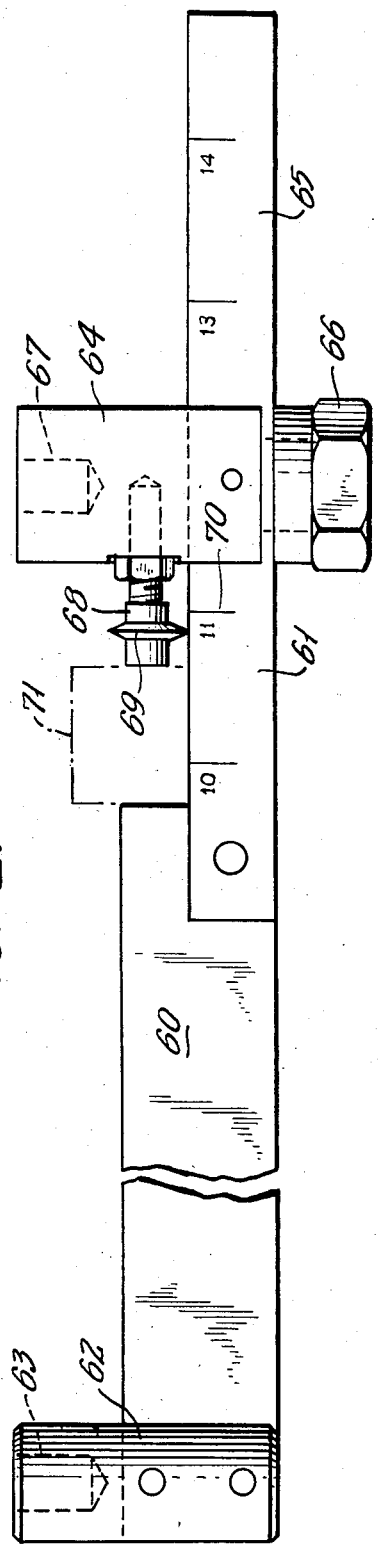

FIG. 5.
FIG. 6.
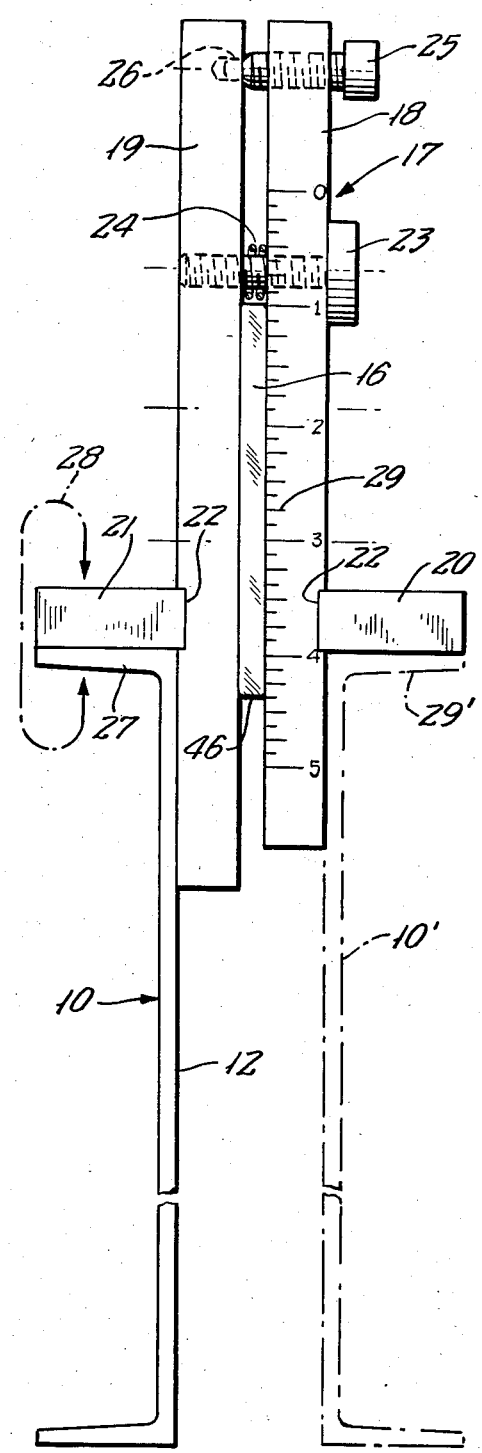
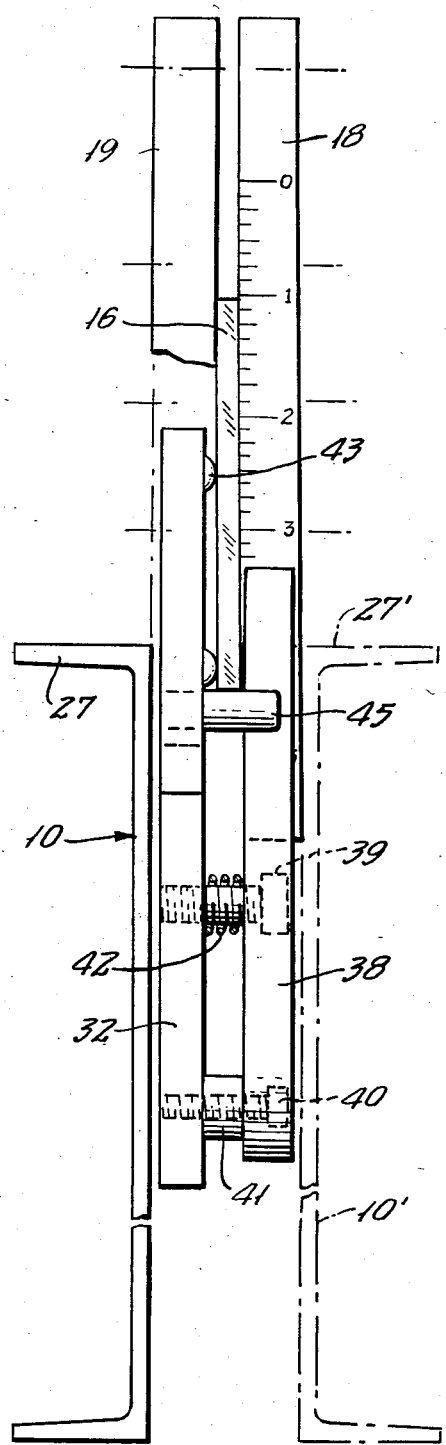

ASSEMBLY FIXTURE FOR STAIR STRINGER WELDMENTS AND THE LIKE

This is a continuation of Ser. No. 671,003 filed on Nov. 13, 1984 now abandoned.

BACKGROUND AND SUMMARY OF THE INVENTION

In the construction of commercial offices and buildings, stairway construction frequently involves the fabrication of stringer weldments comprising metal channel beams to which are welded a plurality of carrier angle elements which function to locate and support tread and riser elements. In the past, a great deal of time and expense has been involved in the fabrication of these weldments because of the relative non-standardization thereof. Thus, while a given multi-level stairwell may utilize a plurality of stringer weldments of similar configuration, there is nevertheless a wide variety of configurations, resulting from the fact that differences in floor-to-floor dimensions and/or differences in stair angles imposed by designer election and/or physical requirements of the structure, require both the angular orientation and the nose-to-nose spacing of the carrier angles to be varied from structure to structure.

Pursuant to the present invention, a highly simplified and inexpensive fixture is provided, which can be set up expeditiously with relatively unskilled labor and which serves to provide precise positioning, orientation and spacing of carrier angle elements in a succession of stringer weldment assemblies. Because of the simple and expeditious set-up capability, the fixture may be used to great advantage, even in the production of a one-off pair of stair stringer weldments. More significantly, in a typical relatively short run, of a plurality of weldment assemblies for a given commercial structure, extremely asignificant production savings may be realized at an extremely modest investment in the fixture equipment and set-up time.

In accordance with the invention, the new fixture assembly includes spaced clamping means, which are securable to the edge flanges of the stringer beam elements. A straight edge reference beam is secured by the clamping means to the beam, and provides a longitudinally extending reference edge against which a series of carrier angle nesting blocks is positioned.

Each of the new fixture assemblies includes a plurality of carrier angle nesting blocks, each provided with a reference dowel positioned against the straight edge of the reference beam. A removable angle gage is temporarily mounted in each nesting block, as it is positioned against the reference beam, and precisely establishes the angular orientation of the nesting block relative to the longitudinal axis of the stringer beam. A quick acting clamp then secures the nesting block in position.

After properly locating and claimping the first of a series of nesting blocks, subsequent nesting blocks are mounted and secured, one at a time, using a spacing gage which is precisely adjustable in advance according to the desired nose-to-nose spacing of the carrier angle elements. To advantage, the spacing gage mounts on the same reference dowels that are used to position the nesting blocks against the reference beam.

Desirably, the fixture assembly of the invention, when fully set-up, includes a small plurality (e.g. five) of nesting blocks secured to the reference beam. After placement and welding of as many carrier angle elements as are accommodated by the number of nesting blocks, the entire fixture is shifted longitudinally along the stringer beam so that a relatively short fixture can accommodate the fabrication of stringers of any length. Further, the fixture is two-sided in that it can be transferred from a "left-hand" stringer to a "right-hand" stringer for the fabrication of matching, opposed stringer pairs.

For a more complete understanding of the above and other features and advantages of the invention, reference should be made to the following detailed description of a preferred embodiment and to the accompanying drawings.

DESCRIPTION OF THE DRAWINGS

FIG. 1 is an elevational view, partly broken away, illustrating the fabrication fixture of the present invention, mounted in position on a typical channel beam stringer element, in preparation for the mounting of a plurality of accurately positioned and oriented carrier angle elements.

FIG. 2 is an enlarged elevational view of a nose-to-nose spacing gage utilized in the set-up of the fixture of FIG. 1.

FIG. 5 is an end elevational view illustrating a calibrated clamping and mounting device, for securing a reference beam to the flange of a stair stringer element.

FIG. 6 is an end elevational view, similar to FIG. 5, but with parts broken away to illustrate the mounting on the reference beam of a nesting block.

DESCRIPTION OF A PREFERRED EMBODIMENT OF THE INVENTION

Figure 3:
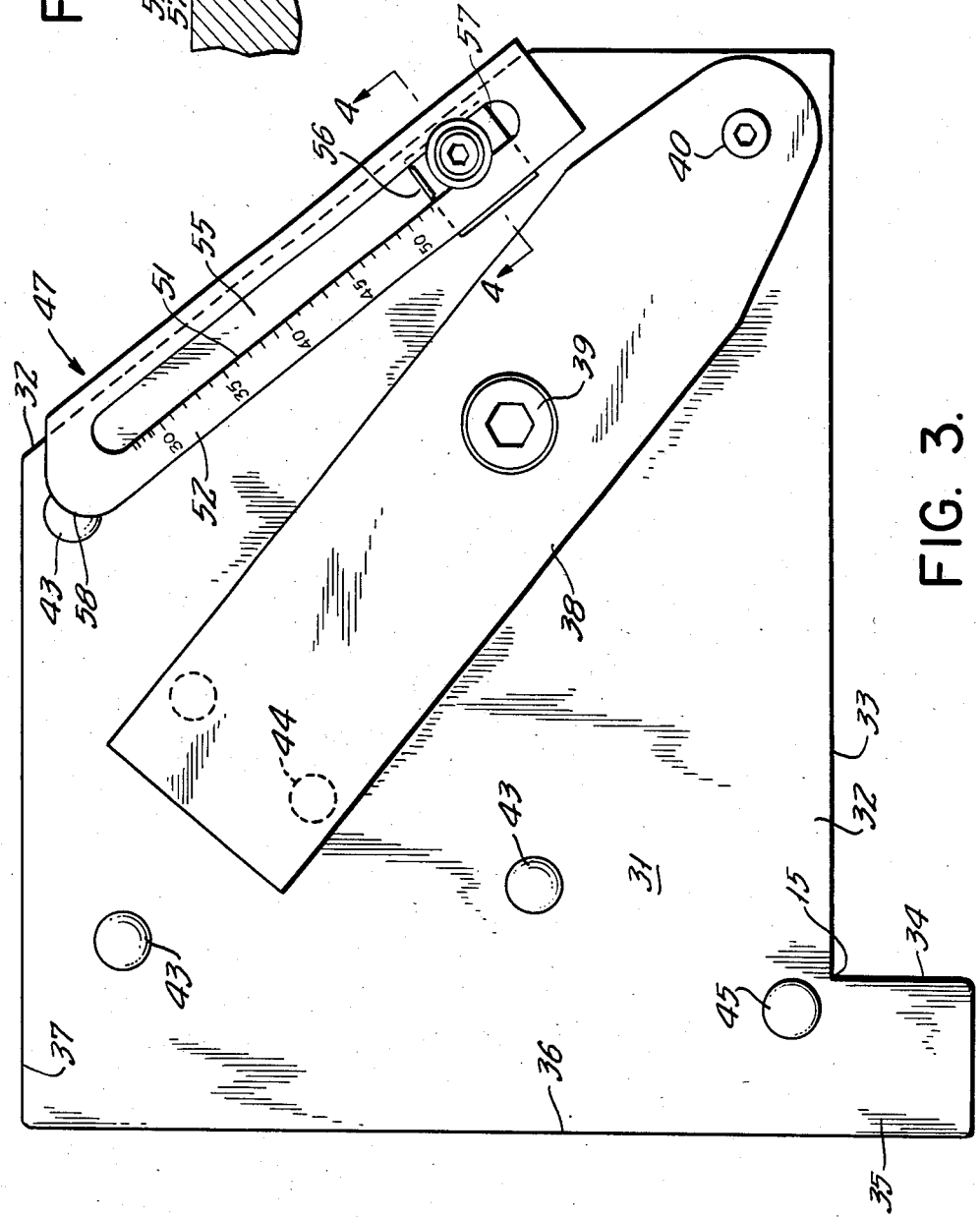
FIG. 3 is an enlarged plan view of a nesting block, a plurality of which are incorporated in the fixture of FIG. 1. Also illustrated in FIG. 3 is an angle gage, which is removably attachable to a pair of nesting blocks during set-up operations.

Referring now to the drawing, the reference numeral 10 designates generally an elongated channel beam, which forms a stringer in a stair assembly. Pursuant to one of the commonly employed stair constructions, a pair of such stringer beams 10 is fabricated by welding thereto, at a predetermined spacing and in a predetermined angular orientation, a plurality of carrier angle elements 11. The carrier angle elements typically are short sections of angle iron, which project outwardly from the flat web section 12 of the stringer beam 10 and are secured thereto by welding. A pair of such stringer beam weldments is arranged in opposing relation, disposed along an angle of, for example, 35 to 40° of incline. In that position, the carrier angles 11 have surface portions 13, 14 which are respectively horizontally and vertically aligned and provide for the positioning and support of tread and riser portions (not shown).

As will be readily understood, the angle of incline at which the stringer beams 10 are disposed is relatively variable. To the same extent, the angular orientation of the carrier angles with respect to the beam varies correspondingly. Likewise, in order to maintain a desired relationship between tread depth and riser height, the nose-to-nose spacing between adjacent carrier angles, that is the distance between the respective apex portions 15 thereof is also a significant variable and will vary as a function of the angular orientation of the carrier elements. The fixture of the present invention provides a rapidly set-up, easily adjustable, relatively high precision (in relation to the normal precision of weldment assemblies) device for positioning of a succession of carrier angle elements during the welding thereof to the carrier beam 10.

As reflected in FIG. 1, the new fixture apparatus includes an elongated, straight edge reference beam 16, in the form of a flat metal bar. Typical dimensions of the reference beam may be approximately four inches wide by approximately seventy inches in length by approximately one quarter inch in thickness. The reference beam 16 is removably secured to the channel beam 10 by means of reference clamps, generally designated by the numeral 17 and shown in detail in FIGS. 5 and 6. Each reference clamp comprises front and back clamping bars 18, 19, each provided at a predetermined level above its lower extremity with a flange-engaging lug 20, 21. The lugs are received in notches 22 in the respective clamping bars, and are rigidly secured therein by bolts or other means.

In the illustrated arrangement, the clamping bars 18, 19 are secured together by a first clamping bolt 23, which extends through the front bar 18 and is threadedly engaged inthe back bar 19. A coil spring 24 is positioned between the clamping bars and around the bolt 23, tending to urge the bars in a separating direction.

At the upper extremity of the clamping bars is a second clamping bolt 25, which is threadedly engaged with the front bar and abuts the rear clamping bar 19, in a recess 26.

In preparation for mounting of the reference bar 16 on the channel beam 10, the back bar lug 21 of a pair of clamps is seated on the upper flange 27 of the channel 10 and is tightly secured thereto, typically by means of a conventional C-clamp, indicated schematically at 28. The preliminary setting of the first and second clamping bolts 23, 25 is such that the lower ends of the clamping bars 18, 19 are separated enough to easily receive the reference bar 16. In this respect, by providing the back bar 19 to be of slightly greater length than the front bar, the reference beam can be laid upon the back bar and slid into the space between the open clamping bars. Calibrations 29 along the edge of one or both of the clamping bars and related to the upper edge of the reference beam, permits the lower edge of the beam to be accurately positioned in relation to the upper surface of the flange 27. When the beam is properly positioned, the respective reference clamps 17 are tightened, typically by tightening of the upper clamping bolts 25.

Desirably, the clamping bars are provided with three sets of holes 30 (FIG. 1) for receiving the lower clamping bolt 23. This permits the lower clamping bolt 23 to be kept as close as practicable to the upper edge of the reference beam, for optimum clamping.

Pursuant to the invention, a plurality of nesting blocks 31 are arranged to be secured along the length of the reference beam 16 for positioning of the carrier angles 11. With reference to FIG. 3, each nesting block comprises a plate 32, formed along one side to provide right angularly related surfaces 33, 34 defining a recess for the positioning of carrier angle members 11. For convenience, the front surface 34 is defined by a rectangular extension 35 of the plate, which desirably measures one inch on a side. The adjacent end surface 36 and opposite side surface 37 of the nesting block also advantageously define a right angle. These features enable the blocks to be utilized conventiently by the set-up workman to determine the right angles, to establish a one inch spacing, etc. A clamping bar 38 is secured to the plate 32 by means of first and second clamping bolts 39, 40. As shown in FIG. 6, the clamping bar 38 is separated from the plate 32 by means of a spacing collar 41 positioned on the clamping bolt 40. A compression spring 42, also positioned between the clamping bar and the adjacent plate 32 and surrounding the clamping bolt 39, tends to move the bar and plate 38, 32 in a separating direction to facilitate application of the nesting block assembly to the reference beam 16 in the manner generally shown in FIG. 1.

For secure clamping, the front face of the plate 32 desirably is provided with localized raised areas 43, arranged in a triangular pattern and cooperating with a pair of raised areas 44 on the underside of the clamping bar 38. Thus, when the nesting block is secured to the reference beam, by tightening of the bolt 39, pressure contact is limited to the localized areas 43, 44. In a typical case, these localized areas may be provided by means of rivet heads or the like.

At a point near the apex 15 of the angle-receiving notch formed by surfaces 33, 34 of the nesting block plate, the plate mounts a reference dowel 45, which projects outward front the front surface of the plate a distance sufficient to project well beyond the front surface of the reference beam 16. The dowel 45 serves a reference pivot for positioning of the nesting block against the reference beam 16, substantially as shown in FIG. 1. Thus, after the reference beam has been mounted on the channel 10, with appropriate depth and alignment, the first nesting block may be applied to the reference beam and positioned thereagainst by pressing the dowel 45 against the lower surface 46 of the reference beam.

Figure 4:
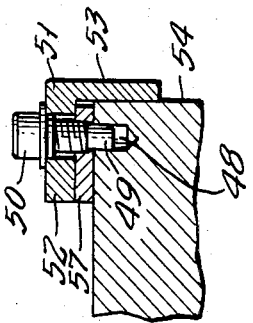
FIG. 4 is a cross sectional view as taken generally along line 4—4 of FIG. 3, illustrating details of the angle gage.

Proper angular orientation of the nesting block is provided by means of an angle gage 47 (see FIGS. 3 and 4) which is removably mounted on the nesting block by means of a recess 48 in the latter which receives the lower extremity 49 of a clamping screw 50. The angle gage includes a calibrated gage bar 51, of L-shaped cross section, the upper portion 52 of which overlies the block plate 32 and the side flange 53 of which extends downward along a side edge 54 of the plate. The gage bar 51 is provided with an elongated slot 55, which slideably receives the clamping screw 50. The calibrations of the gage bar 51 cooperate with the front edge 56 of a movable slide member 57, which is securable tightly to the gage bar by the clamping screw 50.

The desired angular orientation of the nesting block 32 is determined by adjustably positioning the slide block 57 along the elongated slot 55, and then tightening the same by means of the clamping screw 50. This determines the distance of the nose 58 of the angle gage from the center of the recess 48. Thus, when the angle gage is adusted and mounted on the nesting block, the block may be applied over the reference beam 16, until the dowel 45 and the nose 58 of the gage bar contact the lower surface of the reference beam. All that remains is to slide the nesting block one way or the other along the reference beam to a predetermined measured starting position, after which the clamping bolt 39 is tightened to secure the first nesting block in position in the desired precise location and in the desired precise angular orientation on the channel beam 10.

Mounting of the second and subsequent nesting blocks 31 advantageously make use of a spacing gage 60, as shown in FIG. 2. The gage includes a calibrated spacing bar 61, at one end of which is fixed a pin 62 having a recess 63 at one end for the reception of a dowel 45 projecting outward from a nesting block. A second pin 64 is slideably adjustable along a calibrated slide bar 65, to which the pin may be secured by a clamping bolt 66. The pin 64 likewise has a recess 67 for the reception of a locating dowel on a second (or subsequent) nesting block. Although any suitable means may be utilized for the adjustable positioning of the adjustable pin 64, it is preferred to provide for substantial precision in this adjustment, because of the cumulative effect of small errors repeated several times over the length of a long stair stringer channel 10. To this end, there is preferentially provided an adjusting screw 68 having a collar 69 that cooperates with calibrations 70 along the length of the slide bar 65. The calibrations may be as finely divided as are appropriate to the circumstances, and can easily be in one hundredth of an inch units if desired. For the sake of simplicity and economy, the adjusting screw 68 typically may have an adjusting range of an inch or less, and may be used in conjunction with gage blocks 71, provided in unit sizes of one inch, to accommodate the full range of desired adjustment.

When the spacing gage is properly adjusted and its clamping bolt 66 tightened, a second nesting block is quickly and easily positioned by fitting the angle gag thereto in the manner illustrated in FIG. 3 and positioning the block along the reference beam such that the locating dowels 45 of the new block and the previous blocks are received in the respective recesses 63, 67 of the spacing gage. The spacing gage, the angle gage and the locating dowel 45 combined to provide for precise positioning and orientation of the next and all subsequent nesting blocks, which may be quickly positioned and clamped in place along the reference beam.

In an advantageous form of the invention, it is quite adequate to provide for the mounting of four to six nesting blocks on the reference beams. After the first set of carrier angles 11 is welded in place, the reference beam, together with its already mounted nesting blocks, is simply shifted longitudinally down the beam. The first nesting block is positioned over the last one of the welded-on carrier angles, and this serves to locate all of the remaining nesting blocks for positioning a second set of carrier angles. This may be repeated as many times as necessary for the particular set of stairs being fabricated.

As is evident in FIG. 5, the assembled fixture may be utilized for the fabrication of both left-hand and right-hand stringer weldments. All that is necessary is to transfer the assembled fixture from one side to the other, properly locate the position of the first angle carrier, and then clamp the lungs 20 to the flange 27' of the opposite side channel beam 10'.

As will be readily appreciated, the fixture may be set up with a great deal of precision, in terms of the position, spacing and orientation of the carrier angle members, and in a highly expeditious manner with relatively minimal skill requirements. Once set up, the use of the fixture results not only in great production economies over conventional precedures, but also in greatly improved production quality, inasmuch as a high level of unit-to-unit uniformity is assured by the use of the fixture.

Because of the overall simplicity, ruggedness and ease of set-up, the fixture of the invention may be used to advantage even on one-off fabrications, and the savings become outstanding on short to medium production runs which are typical of the trade.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

I claim:

1. A welding fixture for the fabrication of stair frame stringer weldments and the like of the type comprising a flanged beam and a plurality of tread supporting brackets secured thereto in uniformly spaced relation and in predetermined angular orientation, which comprises
   (a) a plurality of reference clamps each comprising a pair of clamping elements and a flange-engaging lug projecting laterally from one of said clamping elements,
   (b) means for securing the lugs of said clamps to the flange of stringer element to be fabricated,
   (c) a straight edge reference beam received in and secured by said reference clamps,
   (d) a reference beam being adjustably positioned by said reference clamps at a predetermined spacing with respect to said stringer flange,
   (e) a plurality of carrier angle nesting blocks individually securable to said reference beam for positioning said tread supporting brackets, and
   (f) gage means for establishing uniform spacing of said nesting blocks along said reference beam and uniform angular orientation of said nesting blocks in relation to said reference beam.

2. A fixture according to claim 1, further characterized by
   (a) said nesting blocks each including a reference dowel engageable with an edge of said reference beam.

3. A fixture according to claim 2, further characterized by
   (a) said gage means including an adjustable spacing gage engageable with referencce dowels of adjacent nesting blocks.

4. A fixture according to claim 2, further characterized by
   (a) said gage means including an adjustable angle gage member,
   (b) said nesting blocks having angle gage reference means removably engageable with said angle gage member,
   (c) said angle gage member being engageable with said angle gage reference means and with said reference beam for determining the orientation angle of said nesting block.

5. A fixture according to claim 1, further characterized by
   (a) said reference clamps having flange-engaging lungs extending in opposite directions whereby said fixture may be applied to left and right-side stringer elements.

* * * * *